UNITED STATES PATENT OFFICE.

LOUIS VIOLET, OF NEW LEBANON, NEW YORK.

IMPROVEMENT IN COUGH-MIXTURES FOR USE IN CANDIES.

Specification forming part of Letters Patent No. 115,790, dated June 6, 1871.

*To all whom it may concern:*

Be it known that I, LOUIS VIOLET, of New Lebanon, in the county of Columbia and State of New York, have invented a new and Improved Composition for Cough Candy; and I do hereby declare that the following is a full, clear, and exact description thereof, which will enable others skilled in the art to make and use the same.

This invention relates to a new composition for the filling of cough-candies; and consists in compounding the following ingredients in about the proportions stated, to wit: One pound extract of hoarhound and one pound extract of liquorice are dissolved in alcohol and boiled down to the consistency of paste, then mixed with four pounds of gum arabic and four pounds of sugar, which were previously dissolved in water.

The medicine is, as a gum filling, put up in candies of suitable shape and style, and is harmless to the stomach but effective in curing inflammatory diseases and affections of the throat.

Having thus described my invention, I claim as new and desire to secure by Letters Patent—

The cough-mixture for candies herein described.

The above specification of my invention signed by me this 1st day of May, 1871.

LOUIS VIOLET.

Witnesses:
GEO. W. MABEE,
T. B. MOSHER.